US011379932B2

(12) United States Patent
Archer, III et al.

(10) Patent No.: US 11,379,932 B2
(45) Date of Patent: Jul. 5, 2022

(54) SOCIAL WATCHLIST

(71) Applicant: AT&T Intellectual Property I, L.P., Atlanta, GA (US)

(72) Inventors: Virgil L. Archer, III, Los Angeles, CA (US); James Ayers, Santa Monica, CA (US); Gowrishankar Subramaniam Natarajan, Torrance, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 366 days.

(21) Appl. No.: 16/037,838

(22) Filed: Jul. 17, 2018

(65) Prior Publication Data

US 2020/0027170 A1 Jan. 23, 2020

(51) Int. Cl.
| | | |
|---|---|---|
| *G06Q 10/00* | (2012.01) | |
| *G06Q 50/00* | (2012.01) | |
| *H04L 67/306* | (2022.01) | |
| *H04L 67/50* | (2022.01) | |
| *G06F 40/30* | (2020.01) | |

(52) U.S. Cl.
CPC ............. *G06Q 50/01* (2013.01); *G06F 40/30* (2020.01); *H04L 67/22* (2013.01); *H04L 67/306* (2013.01)

(58) Field of Classification Search
CPC ......... G06Q 50/01; G06F 40/30; H04L 67/22; H04L 67/306
See application file for complete search history.

(56) References Cited

U.S. PATENT DOCUMENTS

| | | | | |
|---|---|---|---|---|
| 8,930,204 | B1* | 1/2015 | Igoe | G06F 16/335 |
| | | | | 705/2 |
| 8,965,835 | B2* | 2/2015 | Avner | G06Q 30/0241 |
| | | | | 707/600 |
| 9,037,503 | B2 | 5/2015 | Ho et al. | |
| 9,098,606 | B1* | 8/2015 | Chau | G06F 16/248 |
| 9,207,832 | B1 | 12/2015 | Khouri et al. | |
| 9,275,171 | B2* | 3/2016 | Gross | G06Q 30/02 |
| 9,336,192 | B1* | 5/2016 | Barba | G06F 40/30 |

(Continued)

OTHER PUBLICATIONS

K. Zhang et al., "A probabilistic graphical model for brand reputation assessment in social networks," 2013 IEEE/ACM International Conference on Advances in Social Networks Analysis and Mining (ASONAM 2013), Niagara Falls, ON, Canada, 2013, pp. 223-230, doi: 10.1109/ASONAM.2013.6785712.*

(Continued)

*Primary Examiner* — Gabrielle A McCormick
(74) *Attorney, Agent, or Firm* — Guntin & Gust, PLC; Douglas Schnabel

(57) ABSTRACT

In one embodiment, a method includes receiving information from a social network and identifying one or more topics of interest from the received information. The method also includes converting text from the received information to one or more social intents and determining, based on the topics of interest and the social intents, a media recommendation. The method further includes receiving account information from a user account, the account information including one or more entitlements. The method further includes determining that the media recommendation complies with the entitlements and automatically adding the media recommendation to a social watchlist associated with the user account.

20 Claims, 5 Drawing Sheets

(56) References Cited

U.S. PATENT DOCUMENTS

| | | | |
|---|---|---|---|
| 9,466,083 | B1 | 10/2016 | Sanders |
| 9,558,244 | B2 | 1/2017 | Busey et al. |
| 9,641,574 | B1* | 5/2017 | Lewis .................. H04L 65/403 |
| 9,767,208 | B1* | 9/2017 | Chow ................. G06F 16/9535 |
| 9,799,081 | B1 | 10/2017 | Lewis et al. |
| 10,631,029 | B1* | 4/2020 | Nijim ................... H04N 21/251 |
| 2009/0055396 | A1* | 2/2009 | Svendsen ............ G11B 27/105 |
| 2010/0100845 | A1* | 4/2010 | Khan .................. G06F 16/9535 |
| | | | 715/810 |
| 2010/0121849 | A1* | 5/2010 | Goeldi .................. G06Q 50/01 |
| | | | 707/736 |
| 2011/0107374 | A1 | 5/2011 | Roberts et al. |
| 2012/0047219 | A1* | 2/2012 | Feng .................. G06F 16/2465 |
| | | | 707/661 |
| 2012/0290399 | A1* | 11/2012 | England ................. G06Q 50/01 |
| | | | 705/14.66 |
| 2013/0073568 | A1* | 3/2013 | Federov ............. G06F 16/9535 |
| | | | 707/E17.069 |
| 2013/0262431 | A1* | 10/2013 | Garner ................. G06F 16/435 |
| | | | 707/758 |
| 2013/0311485 | A1* | 11/2013 | Khan .................... G06F 16/335 |
| | | | 707/748 |
| 2014/0074856 | A1* | 3/2014 | Rao ........................ G06Q 50/01 |
| | | | 707/E17.071 |
| 2014/0207622 | A1* | 7/2014 | Vijayaraghavan .... G06F 16/951 |
| | | | 705/26.62 |
| 2014/0223099 | A1* | 8/2014 | Kidron ................ G06F 12/0806 |
| | | | 711/118 |
| 2014/0244612 | A1* | 8/2014 | Bhasin ................... G06Q 50/01 |
| | | | 707/706 |
| 2014/0310353 | A1* | 10/2014 | Schneider ............... H04L 51/32 |
| | | | 709/204 |
| 2015/0006242 | A1* | 1/2015 | Bhasin ............... G06Q 30/0201 |
| | | | 705/7.29 |
| 2015/0026083 | A1 | 1/2015 | Paliwal et al. |
| 2015/0081860 | A1* | 3/2015 | Kuehnel .................. H04W 8/18 |
| | | | 709/224 |
| 2015/0088684 | A1* | 3/2015 | Nygaard ............ G06Q 30/0282 |
| | | | 705/26.7 |
| 2015/0089371 | A1 | 3/2015 | Zaslavsky et al. |
| 2015/0135329 | A1* | 5/2015 | Aghasaryan ........ H04L 63/0421 |
| | | | 726/26 |
| 2015/0181289 | A1* | 6/2015 | Wheatley ............. H04N 21/442 |
| | | | 725/14 |
| 2015/0181301 | A1 | 6/2015 | Bloch et al. |
| 2015/0248651 | A1* | 9/2015 | Akutagawa ............. H04L 51/14 |
| | | | 705/7.19 |
| 2016/0132900 | A1* | 5/2016 | Duggal .............. G06Q 30/0201 |
| | | | 705/7.29 |
| 2016/0210602 | A1* | 7/2016 | Siddique ................. G06Q 50/24 |
| 2016/0360253 | A1 | 12/2016 | Busey et al. |
| 2017/0353469 | A1* | 12/2017 | Selekman ............. G06Q 50/01 |
| 2018/0018321 | A1* | 1/2018 | Jones .................... G06F 40/166 |
| 2018/0020067 | A1* | 1/2018 | Sadanandan .......... H04L 67/306 |
| 2018/0070138 | A1 | 3/2018 | Chai et al. |
| 2018/0349485 | A1* | 12/2018 | Carlisle ............... G06F 16/9535 |
| 2019/0208242 | A1* | 7/2019 | Bates ................. H04N 21/2543 |

OTHER PUBLICATIONS

C. Cui and W. Mao, "Recognize user intents in online interactions from massive social media data," 2017 IEEE 2nd International Conference on Big Data Analysis (ICBDA), Beijing, 2017, pp. 11-15, doi: 10.1109/ICBDA.2017.8078805.*

Ma, X. et al., "Exploring sharing patterns for video recommendation on YouTube-like social media," Feb. 24, 2013, 17 pages.

* cited by examiner

US 11,379,932 B2

SOCIAL WATCHLIST

TECHNICAL FIELD

This disclosure generally relates to a social watchlist, and more specifically to adding a media recommendation to a social watchlist.

BACKGROUND

As digital media becomes more accessible, the selection of programs available to viewers of digital media increases, making it more difficult for viewers to select a program. Platforms try to ease this burden by recommending programs to viewers, but these recommendations are based on limited data and are often not consistent with the viewers' preferences. Viewers can research the universe of digital media themselves, but this requires considerable time and effort.

SUMMARY OF PARTICULAR EMBODIMENTS

According to an embodiment, a method includes receiving information from a social network and identifying one or more topics of interest from the received information. The method also includes converting text from the received information to one or more social intents and determining, based on the topics of interest and the social intents, a media recommendation. The method further includes receiving account information from a user account, the account information including one or more entitlements. The method further includes determining that the media recommendation complies with the entitlements and automatically adding the media recommendation to a social watchlist associated with the user account.

According to another embodiment, one or more computer-readable non-transitory storage media embodies software that is executable to receive information from a social network and identify one or more topics of interest from the received information. The software is further executable to convert text from the received information to one or more social intents and determine, based on the topics of interest and the social intents, a media recommendation. The software is further executable to receive account information from a user account, the account information including one or more entitlements. The software is further executable to determine that the media recommendation complies with the entitlements and automatically add the media recommendation to a social watchlist associated with the user account.

According to yet another embodiment, a system includes one or more processors and a memory coupled to the processors comprising instructions executable by the processors to receive information from a social network and identify one or more topics of interest from the received information. The instructions are further executable to convert text from the received information to one or more social intents and determine, based on the topics of interest and the social intents, a media recommendation. The instructions are further executable to receive account information from a user account, the account information including one or more entitlements. The instructions are further executable to determine that the media recommendation complies with the entitlements and automatically add the media recommendation to a social watchlist associated with the user account.

A technical advantage of this disclosure is that automatically storing media recommendations on a social watchlist eliminates the need for a user to maintain a list of media recommendations on a device. Another technical advantage of this disclosure is that automatically populating a social watchlist with recommendations based on a social network may reduce churn of a customer base. For example, rather than a subscriber of an over-the-top (OTT) service discontinuing his service upon completion of watching a show, the subscriber may watch another show recommended in the subscriber's social watchlist, thus extending the subscriber's tenure as a customer and improving a core metric of the OTT service.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DESCRIPTION OF EXAMPLE EMBODIMENTS

Viewers of media content are increasingly relying on recommendations from friends and other individuals they follow online to discover new media content. However, viewers may run into difficulties remembering or storing these recommendations since remembering can be unreliable and storing requires effort. The media recommendation system of this disclosure uses social integration and natural language processing capabilities to leverage sentiment from the viewer's social networks, which eliminates the need for the viewer to maintain his own list of friends' recommendations. The media recommendation system scours the viewer's social network feeds and the viewer's social graph and runs the sentiment through natural language processing to generate media recommendations. These recommendations are automatically stored on the viewer's social watchlist, which may be easily accessible to the viewer through a tab or carousel.

Figure 1:
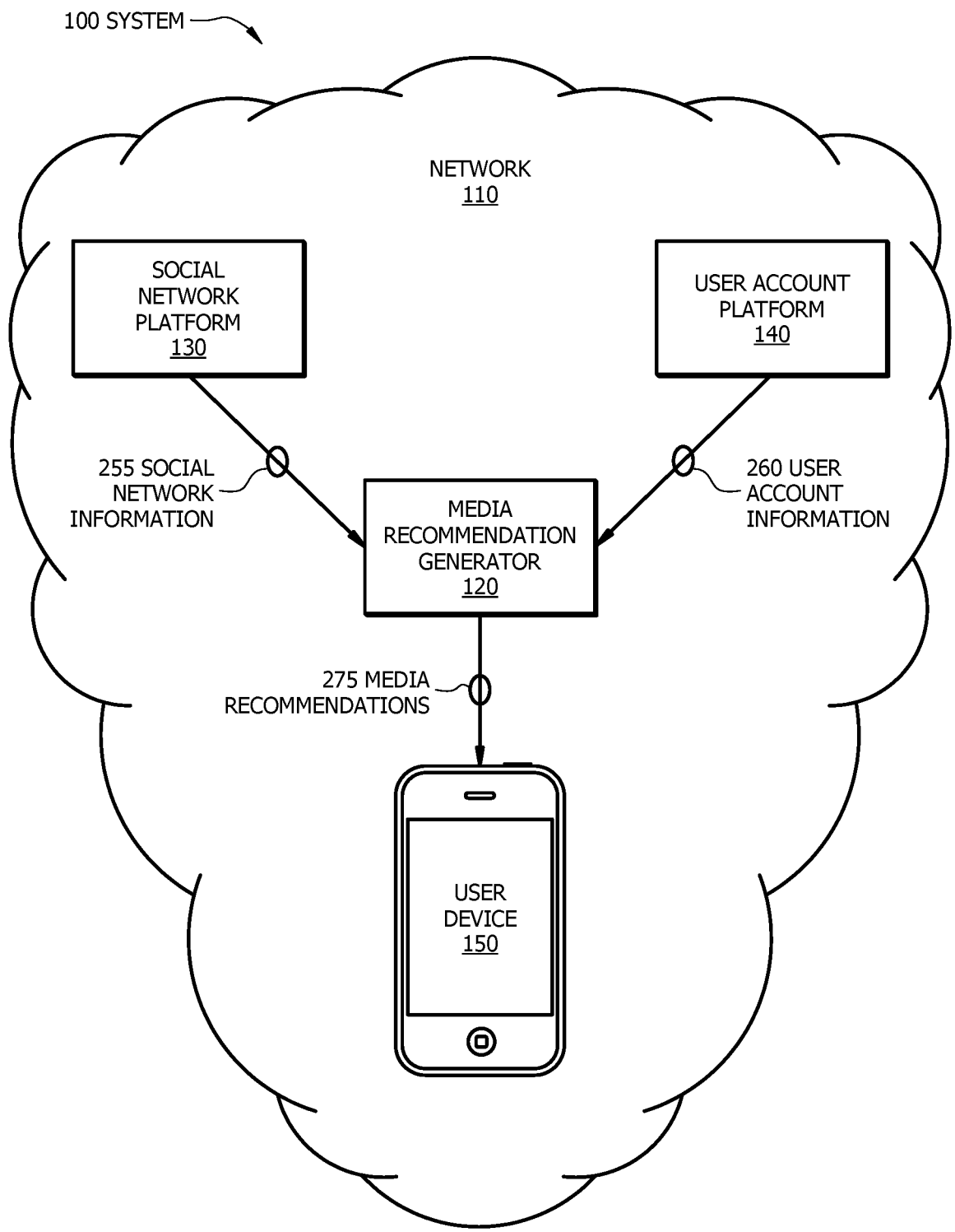
FIG. 1 illustrates an example system for generating a media recommendation.
Figure 2:
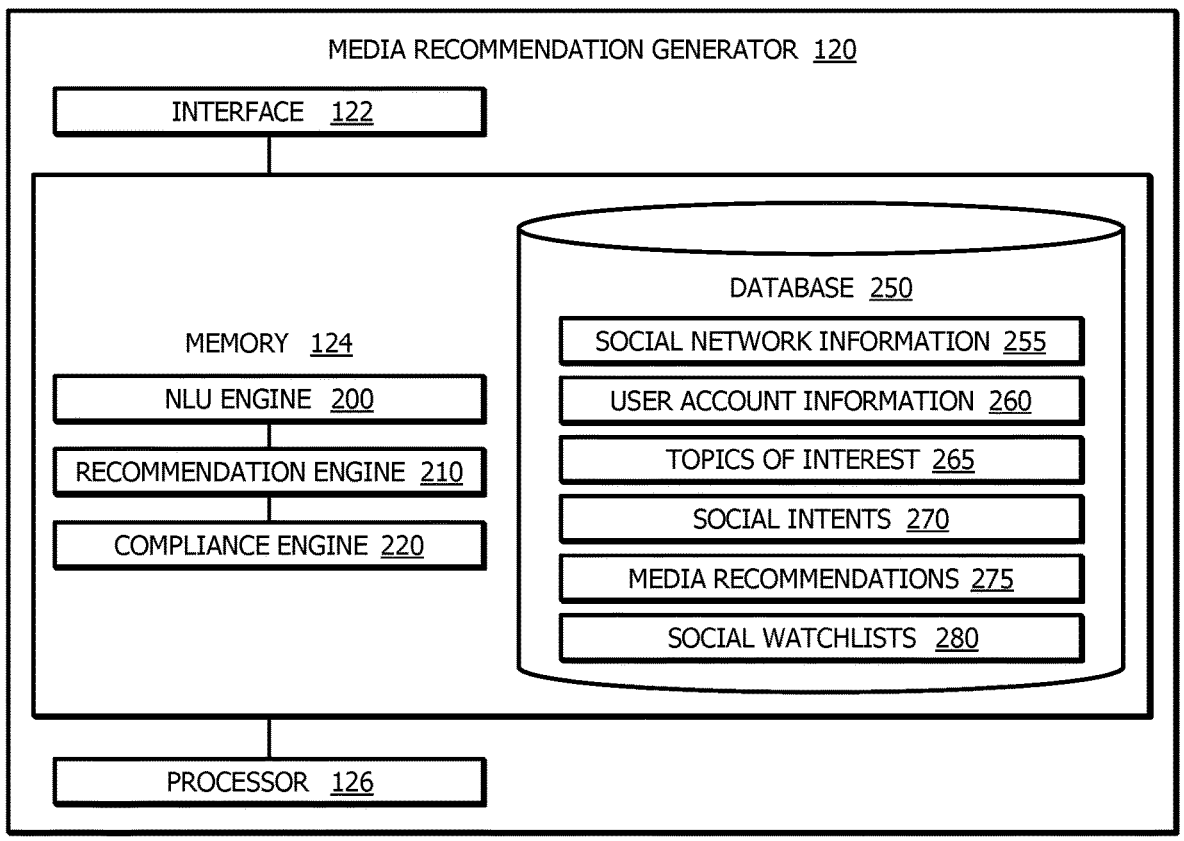
FIG. 2 illustrates an example media recommendation generator that may be used by the system of FIG. 1.
Figure 3:
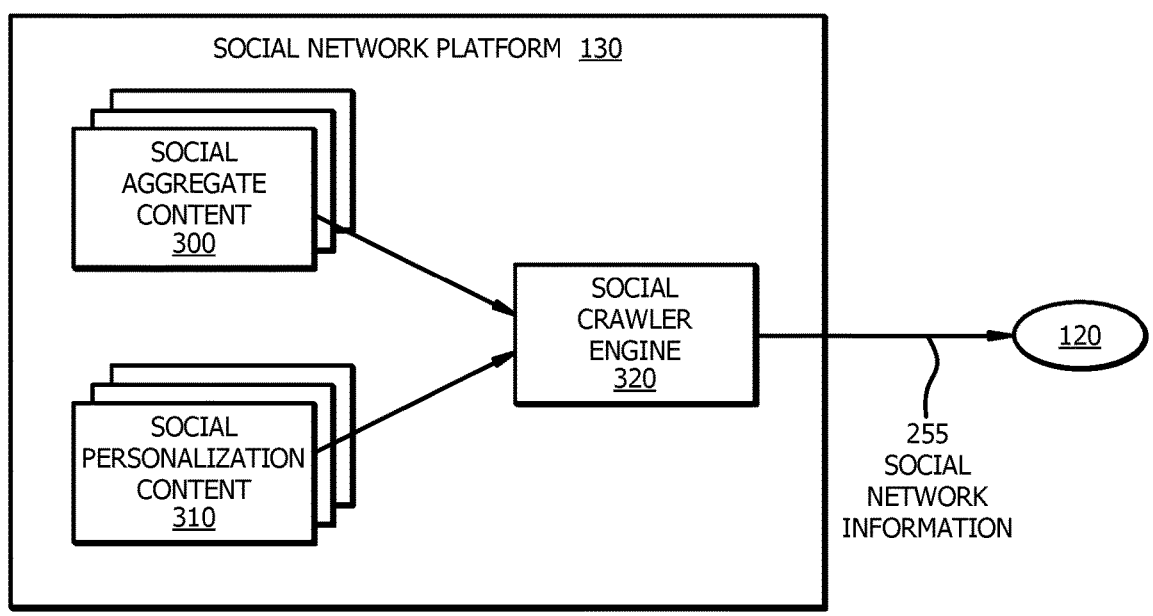
FIG. 3 illustrates an example social network platform that may be used by the system of FIG. 1.
Figure 4:
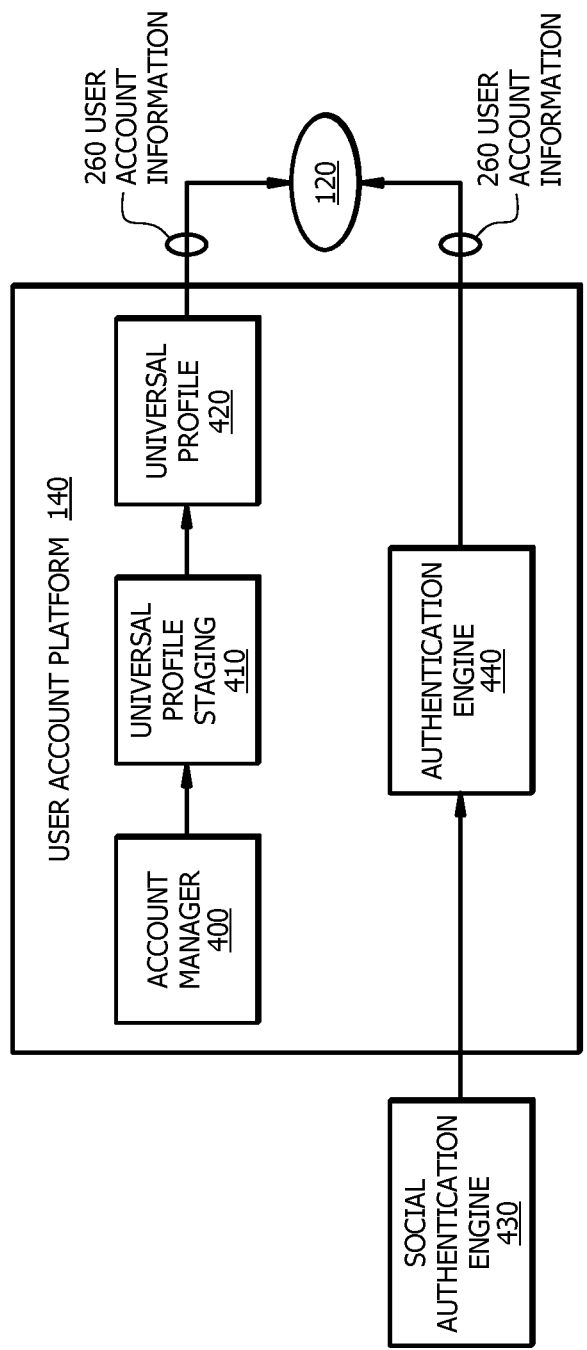
FIG. 4 illustrates an example user account platform that may be used by the system of FIG. 1.
Figure 5:
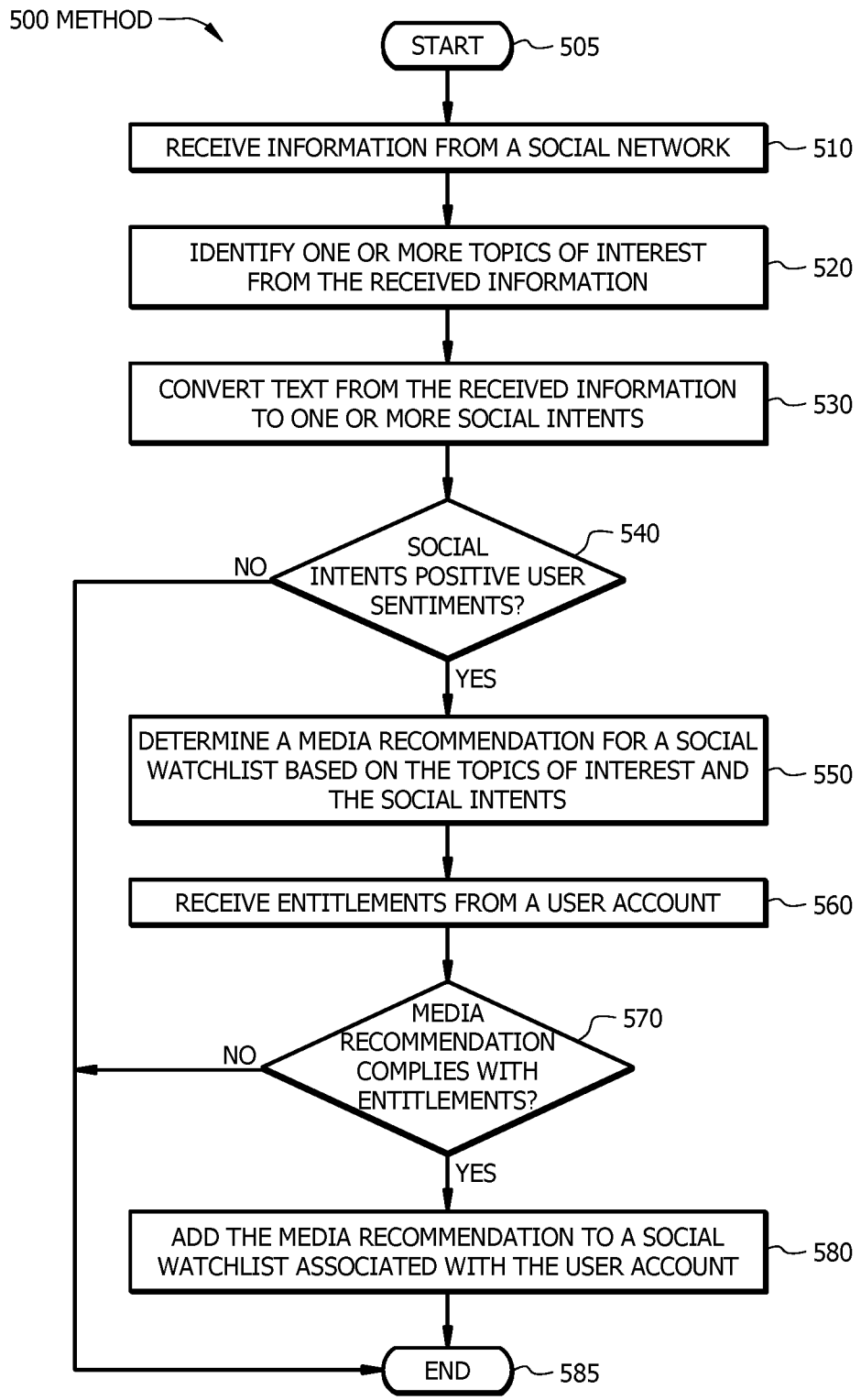
FIG. 5 illustrates an example method for generating a media recommendation.
Figure 6:
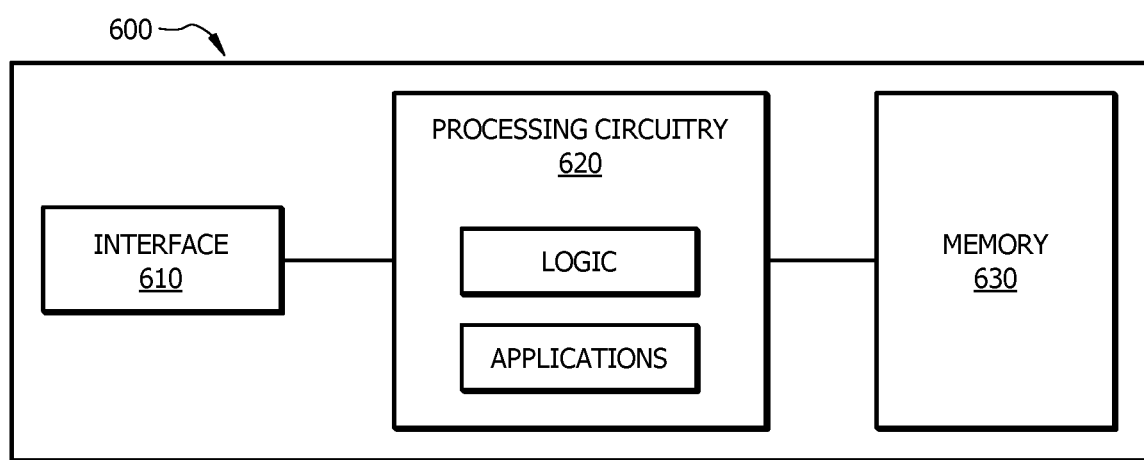
FIG. 6 illustrates an example computer system that may be used by the systems and methods described herein.

FIGS. 1 through 6 show example systems and methods for generating a media recommendation. FIG. 1 shows an example system for generating a media recommendation and FIG. 2 shows an example media recommendation generator that may be used by the system of FIG. 1. FIG. 3 shows an example social network platform that may be used by the system of FIG. 1 and FIG. 4 shows an example user account platform that may be used by the system of FIG. 1. FIG. 5 shows an example method for generating a media recommendation. FIG. 6 shows an example computer system that may be used by the systems and methods described herein.

FIG. 1 illustrates an example system 100 for generating a media recommendation. System 100 of FIG. 1 includes a network 110, a media recommendation generator 120, a social network platform 130, a user account platform 140, and a user device 150. System 100 or portions thereof may be associated with an entity, which may include any entity, such as a business or company, that generates media recommendations. The elements of system 100 may be implemented using any suitable combination of hardware, firmware, and software.

Network 110 may be any type of network that facilitates communication between components of system 100. Network 110 may connect media recommendation generator 120, social network platform 130, user account platform 140, and user device 150 of system 100. Although this disclosure shows network 110 as being a particular kind of network, this disclosure contemplates any suitable network. One or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. For example, media recommendation generator 120 may communicate over network 110, including receiving information from social network platform 130 and user account platform 140 and transmitting information to user device 150.

Media recommendation generator 120 is a computer system that generates media recommendations 275. Media recommendations 275 are suggestions for textual, visual, and/or aural content that can be displayed on user device 150. Media recommendations 275 may include recommendations for movies, television programs, television series, podcasts, video games, blogs, music videos, movie trailers, comedy clips, sports shows, live streaming events, news broadcasts, and/or any other suitable content. Media recommendation generator 120 may add one or more media recommendations 275 to a social watchlist. A social watchlist is a list of media recommendations generated by media recommendation generator 120. Media recommendation generator 120 may generate media recommendations based on social network information 255 (e.g., trending topics on social media websites or user posts to social media websites) received from social network platform 130 and user account information 260 (e.g., entitlements such as a subscription to a cable provider) received from user account platform 140. Media recommendation generator 120 is described in more detail in FIG. 2 below.

Social network platform 130 of system 100 represents one or more components that can receive, generate, store, and/or transmit social network information 255. Social network platform 130 may include a network of social interactions and personal relationships. Social network platform 130 may include one or more social networking websites and one or more social networking services. Social network platform 130 may include one or more social graphs depicting personal relationships of internet users. The social graphs may depict a global mapping of people and how they are related. Media recommendation generator 120 may scour a user's social network feeds and a user's social graph within social network platform 130 to collect social network information 255. Social network information 255 may include common threads or trending topics in social media (e.g., the Avengers movie, the Westworld television series, the volcanic eruption in Hawaii, or Lady Gaga). Social network information 255 may include information associated with a user of a social watchlist, such as the user's social media posts (e.g., posts to Twitter, Facebook, and Instagram). Social network platform 130 may crawl one or more social networking websites for social network information 255 and transmit social network information 255 to media recommendation generator 120. Social network platform 130 is described in more detail in FIG. 3 below.

User account platform 140 of system 100 represents one or more components that can receive, generate, store, and/or transmit user account information 260. User account platform 140 may manage and organize user account information 260. User account information 260 is information associated with a user of a social watchlist. User account information 260 may include the types of accounts associated with a user, user profiles, and user entitlements (e.g., user subscriptions). User account platform 140 may be associated with an entity such as a satellite service provider, a cable service provider, an Internet service provider, a social media service provider, any other suitable content provider, or any suitable combination of the proceeding. User account platform 140 may organize user account information 260 into a snapshot representative of the user and transmit the snapshot to media recommendation generator 120. User account platform 140 is described in more detail in FIG. 4 below.

User device 150 of system 100 is any component that can display information received from media recommendation generator 120. User device 150 may receive media recommendations 275 from media recommendation generator 120 and display media recommendations 275 to a user of user device 150. User device 150 may display media recommendations 275 on a social watchlist. User device 150 may allow a user of user device 150 to manipulate the displayed media recommendations 275. For example, user device 150 may be a touch screen that allows a user of user device 150 to select media recommendation 275 for viewing or scroll through media recommendations 275. A user of user device 150 may be an individual, a group of individuals, a machine, or an entity.

User device 150 may include any suitable computing device that may be used to access media recommendation generator 120 through network 110. User device 150 may include a mobile computing device with wireless network connection capabilities (e.g., wireless-fidelity (WI-FI), and/or BLUETOOTH capabilities). For example, user device 150 may include a smartphone, a laptop computer, or a tablet computer. User device 150 may also include a non-mobile device such as a television or a desktop computer. In certain embodiments, a number of different user devices 150 may be associated with a particular user. For example, a particular user may own each of a smartphone, a laptop, and a television, and may use such devices to access the one or more media recommendations 275 as described herein.

User device 150 may submit information such as a service request (e.g., request access to a social watchlist) to media recommendation generator 120. The information submitted from user device 150 may pass through an application programming interface (API) gateway, such as a firewall. The API gateway may prevent or mitigate attacks (e.g., a Distributed Denial of Service attack) on media recommendation generator 120. The API gateway may validate user device 150 prior to granting user device 150 access to media recommendation generator 120. For example, the API gateway may provide a security token to user device 150 to validate user device 150.

Although FIG. 1 illustrates a particular arrangement of network 110, media recommendation generator 120, social network platform 130, user account platform 140, and user device 150, this disclosure contemplates any suitable arrangement of network 110, media recommendation generator 120, social network platform 130, user account platform 140, and user device 150. Two or more of network 110, media recommendation generator 120, social network platform 130, user account platform 140, and user device 150 may be connected to each other directly, bypassing network 110. Two or more of network 110, media recommendation generator 120, social network platform 130, user account platform 140, and user device 150 may be physically or logically co-located with each other in whole or in part. Although FIG. 1 illustrates a particular number of networks 110, media recommendation generators 120, social network platforms 130, user account platforms 140, and user devices 150, this disclosure contemplates any suitable number of networks 110, media recommendation generators 120, social network platforms 130, user account platforms 140, and user devices 150.

In operation, media recommendation generator 120 receives social network information 255 from social network platform 130. Media recommendation generator 120 leverages topics of interest (e.g., HBO's original television series Westworld) and sentiments (e.g., a user's positive attitude toward Westworld) from social network information 255 to generate media recommendation 275 (e.g., Westworld). Media recommendation generator 120 receives user account information 260 associated with a user of user device 150 from user account platform 140. User account information 260 includes the user's entitlements (e.g., a cable television subscription or a podcast subscription). Media recommendation generator 120 determines whether media recommendation 275 complies with the entitlements. Based on this determination, media recommendation generator 120 automatically adds media recommendation 275 to the user's social watchlist. Media recommendation generator 120 transmits the social watchlist, which includes media recommendation 275, to user device 150. User device 150 displays the social watchlist to the user.

As such, system 100 of FIG. 1 generates media recommendations 275 for a user based on the user's social network and automatically adds media recommendations 275 to the user's social watchlist, which presents media recommendations to the user that may otherwise remain unknown and eliminates the need for the user to maintain the user's own list of media recommendations from friends.

FIG. 2 illustrates example media recommendation generator 120 that may be used by the system of FIG. 1. Media recommendation generator 120 includes interface 122, memory 124, and processor 126. Memory 124 includes natural language understanding (NLU) engine 200, recommendation engine 210, compliance engine 220, and database 250. Database 250 includes social network information 255, user account information 260, topics of interest 265, social intents 270, media recommendations 275, and social watchlists 280.

Interface 122 of media recommendation generator 120 represents any suitable computer element that can receive information from network 110, transmit information through network 110, perform suitable processing of the information, communicate to other components (e.g., social network platform 130) of system 100, or any combination of the preceding. Interface 122 may receive social network information 255 from social network platform 130 via network 110, for example. Interface 122 may transmit media recommendations 275 to user device 150, as another example. Interface 122 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 124 of media recommendation generator 120 stores, permanently and/or temporarily, received and transmitted information, as well as system software, control software, other software for media recommendation generator 120, and a variety of other information. Memory 124 may store information for execution by processor 126. Memory 124 stores NLU engine 200, recommendation engine 210, compliance engine 220, and database 250. Memory 124 includes any one or a combination of volatile or non-volatile local or remote devices suitable for storing information. Memory 124 may include Random Access Memory (RAM), Read-only Memory (ROM), magnetic storage devices, optical storage devices, or any other suitable information storage device or a combination of these devices. Memory 124 may include any suitable information for use in the operation of media recommendation generator 120. Additionally, memory 124 may be a component external to (or may be partially external to) media recommendation generator 120. Memory 124 may be located at any location suitable for memory 124 to communicate with media recommendation generator 120.

Processor 126 of media recommendation generator 120 controls certain operations of media recommendation generator 120 by processing information received from interface 122 and memory 124 or otherwise accessed by processor 126. Processor 126 communicatively couples to interface 122 and memory 124. Processor 126 may include any hardware and/or software that operates to control and process information. Processor 126 may be a programmable logic device, a microcontroller, a microprocessor, any suitable processing device, or any suitable combination of the preceding. Additionally, processor 126 may be a component external to media recommendation generator 120. Processor 126 may be located in any location suitable for processor 126 to communicate with media recommendation generator 120. Processor 126 controls the operation of NLU engine 200, recommendation engine 210, and compliance engine 220.

NLU engine 200 of media recommendation generator 120 is an application that analyzes social network information 255 received from social network platform 130 of system 100. NLU engine 200 may use machine learning and/or artificial intelligence to process natural language and analyze sentiment. NLU engine 200 may identify one or more topics of interest 265 from social network information 255. Topics of interest 265 are layers and levels of interest categorized by topic (e.g., a topic of conversation). For example, topic of interest 265 may include social network information 255 concerned with discussions about a particular movie (e.g., the Avengers movie), a particular movie genre (e.g., action films), or a particular movie franchise (e.g., the Marvel franchise). Topics of interest 265 may include trending topics. A trending topic is the subject of multiple posts on one or more social media websites within a short period of time. Topics of interest 265 may include trending movies, trending television series, and trending events from social media websites such as Twitter, Facebook, YouTube, and Instagram.

NLU engine 200 may rank each topic of interest 265 based on a strength of an association between topic of interest 265 and a user of social watchlist 280. For example, NLU engine 200 may receive social network information 255 indicating that five Facebook friends of a user of user device 150 discussed the HBO television series Westworld. NLU engine 200 may also receive social network information 255 indicating that two celebrities that the user follows on Twitter discussed the HBO series Game of Thrones. NLU engine 200 may then generate topics of interest 265 for the HBO series Westworld and the HBO series Game of Thrones and rank the HBO series Westworld higher than the HBO series Game of Thrones based on the number of individuals that discussed the topic of interest 265 (e.g., five versus two) and/or the level of the relationship to the user (e.g., friend versus celebrity following). NLU engine 200 may assign a weight to each topic of interest 265 based on the strength of the relationship between topic of interest 265 and the user. Each weight may be represented by a number from 1 to 10, with 1 representing a distant relationship (e.g., a celebrity following by a friend of the user) and 10 representing a close relationship with the user (e.g., a Facebook friend that the user interacts with online on a daily basis).

NLU engine 200 may convert text from social network information 255 (e.g., a Twitter post by a user) to one or more social intents 270. A social intent 270 is a sentiment, such as a view or attitude associated with topic of interest 265. NLU engine 200 may analyze the text of social network information 255 and extract one or more social intents 270 from the text. Social intents 270 may be categorized as positive, negative, or neutral. Social intent 270 may represent a positive attitude toward topic of interest 265, a negative attitude toward topic of interest 265, or a neutral attitude toward topic of interest 265.

NLU engine 200 may determine social intents 270 using one or more methods. For example, NLU engine 200 may determine social intent 270 based on keywords by searching the text of social network information 255 for certain keywords associated with positive sentiments (e.g., "good," "like," and smiley faces), negative sentiments (e.g., "bad," "not good," and frowny faces), and neutral sentiments (e.g., "okay" and neutral faces). As another example, NLU engine may determine an overall social intent 270 of a cluster of information, such as an entire conversation between two individuals about an Avengers movie. As still another example, NLU engine 200 may determine a targeted social intent 270, such as a sentiment for a certain phrase within the conversation about the Avengers movie. NLU engine 200 transmits topics of interest 265 and social intents 270 to recommendation engine 210.

NLU engine 200 may assign each social intent 270 a weight. The weight may represent a calculated predicted level of interest of a user in topic of interest 265. For example, NLU engine 200 may determine, based on a keyword search of the text of social network information 255 associated with topic of interest 265, that 80 percent of the keywords are associated with a positive sentiment. Based on this determination, NLU engine 200 may assign topic of interest 265 a social intent weight of 8 on a scale of 1 to 10, indicating that the sentiment extracted from the text of social network information 255 associated with topic of interest 265 is 80 percent positive.

Recommendation engine 210 of media recommendation generator 120 is a computer program that determines media recommendations 275 based on topics of interest 265 and/or social intents 270 received from NLU engine 200. Recommendation engine 210 may generate media recommendation 275 based on the weight assigned to topic of interest 265 and/or social intent 270. For example, recommendation engine 210 may generate media recommendation 275 for the television series Westworld upon determining that a weight (e.g., 6) assigned to topic of interest 265 is greater than a predetermined threshold (e.g., 5). As another example, recommendation engine 210 may generate media recommendation 275 for the television series Westworld upon determining that a weight (e.g., 8) assigned to social intent 270 associated with topic of interest 265 is greater than a predetermined threshold (e.g., 5). As still another example, recommendation engine 210 may generate media recommendation 275 for the television series Westworld upon determining that a weight assigned to social intent 270 associated with topic of interest 265 is greater than a predetermined threshold and a weight assigned to social intent 270 associated with topic of interest 265 is greater than a predetermined threshold. The weight may represent a calculated level of interest of a user of social watchlist 280 in media recommendation 275.

Recommendation engine 210 of media recommendation generator 120 may determine media recommendations 275 based on user account information 260. User account information 260 may include a log of queries (e.g., a search request by a user) received by user device 150, and recommendation engine 210 may determine that one or more of the queries are related to a media entity and generate media recommendation 275 based at least in part on that query. User account information 260 may include a user's viewing history, and recommendation engine 210 may generate media recommendation 275 based at least in part on the user's viewing history. For example, twenty percent of a user's viewing history within a certain period of time (e.g., a month) may be superhero movies. Recommendation engine 275 may determine from the user's viewing history that the user likes superhero movies, and recommendation engine 210 may generate media recommendation 275 for the Avengers based at least in part on the user's viewing history of superhero movies. User account information 260 may include media recommendations 275 from a user's friend's social watchlist 280, and recommendation engine 275 may generate media recommendation 275 for the user based at least in part on the user's friend's media recommendations 275. Recommendation engine 210 may transmit media recommendations 275 to compliance engine 220.

Compliance engine 220 of media recommendation generator 120 is a computer program that determines whether media recommendation 275 received from recommendation engine 210 complies with user account information 260. User account information 260 may include entitlements. Entitlements of user account information 260 indicate which rights a user of the user account is entitled to receive. For example, an entitlement may be a subscription to a service (e.g., a television service such as HBO or a podcast hosting service). Compliance engine 220 may determine whether media recommendation 275 complies with the user's entitlements. For example, media recommendation 275 may be the HBO series Westworld, and compliance engine 220 may determine whether the user's entitlements include HBO or another provider of the HBO series Westworld.

If compliance engine 220 determines that media recommendation 275 complies with user account information 260, compliance engine 220 may automatically add media recommendation 275 to social watchlist 280 associated with the user account. Alternatively, if compliance engine 220 determines that media recommendation 275 complies with user account information 260, compliance engine 220 may send an alert (e.g., an email or an interactive function within social watchlist 280) to a user of social watchlist 280 requesting to add media recommendation 275 to the user's social watchlist 280. If the user accepts the request, compliance engine 220 may add media recommendation 275 to social watchlist 280 associated with the user's account.

If compliance engine 220 determines that media recommendation 275 does not comply with user account information 260, compliance engine 220 will not add media recommendation 275 to social watchlist 280 associated with the user account. Compliance engine 220 may periodically check for updates to user account information 260 (e.g., the user entitlements) and add media recommendation 275 to social watchlist 280 upon determining that media recommendation 275 complies with updated user account information 260 (e.g., an added entitlement). Compliance engine 220 may periodically check for updates to user account information 260 (e.g., the user entitlements) and delete media recommendation 275 from social watchlist 280 upon determining that an entitlement in user account information 260 that previously granted the user of the user account access to media recommendation 275 was removed.

Compliance engine 220 may calculate a weight and assign the weight to media recommendation 275. The weight may represent a predicted level of interest of a user of the user account in media recommendation 275. Compliance engine 220 may calculate the weight using the weight of topic of interest 265 and/or the weight of social intent 270 associated with media recommendation 275. For example, the weight of media recommendation 275 may equal an average of the weight of topic of interest 265 and/or the weight of social intent 270. Compliance engine 220 may calculate the weight based on a time media recommendation 275 was generated.

Compliance engine 220 may insert media recommendation 275 into a list of previously added media recommendations 275 of social watchlist 280. The list of media recommendations 275 in social watchlist 280 may be displayed on user device 150 in any suitable format. For example, the list may be displayed on user device 150 vertically, horizontally, or in a scroll or carousel format. Compliance engine 220 may insert media recommendation 275 into a list of previously added media recommendations 275 based a calculated weight of media recommendation 275. For example, if the calculated weight of media recommendation 275 is 7, which may represent a 70 percent predicted level of interest of a user in media recommendation 275, compliance engine 220 may insert media recommendation 275 above a media recommendation having a weight of 6 but below a media recommendation having a weight of 9. Compliance engine 220 may insert media recommendation 275 at the top the list of social watchlist 280. Compliance engine 220 may delete media recommendation 275 from social watchlist 280 as the media content (e.g., a television program) associated with media recommendation 275 expires (i.e., the media content is no longer available for viewing).

Database 250 is any component that can store data associated with system 100. Database 250 may store certain types of information for network 110. Database 250 may be a single database or may include multiple databases. In the illustrated embodiment, database 250 includes social network information 255, user account information 260, topics of interests 265, social intents 270, media recommendations 275, and social watchlists 280. Database 250 may receive data (e.g., social network information 255 and user account information 260) from one or more components external to media recommendation generator 120 (e.g., social network platform 130 or user device 150). Database 250 may receive data (e.g., topics of interest 265, social intents 270, media recommendations 275, and social watchlists 280) generated by one or more components of media recommendation generator 120 (e.g., NLU engine 200, recommendation engine 210, and compliance engine 220).

Database 250 includes any one or a combination of volatile or non-volatile local or remote devices suitable for storing information. Database 250 may include RAM, ROM, magnetic storage devices, optical storage devices, or any other suitable information storage device or a combination of these devices. Although database 250 is shown separate from social network platform 130, user account platform 140, and user device 150 of FIG. 1, database 250 may be located in any location suitable for communication with social network platform 130, user account platform 140, and user device 150. Database 250 may be externally located from system 100. Database 250 may be located in social network platform 130, user account platform 140, and/or user device 150. Although described as a database, database 250 may be implemented as any suitable type of volatile or non-volatile memory. Database 250 may include one or more interfaces and/or processors.

FIG. 3 shows an example social network platform 130 that may be used by system 100 of FIG. 1. Social network platform 130 may include social aggregate content 300, social personalization content 310, and a social crawler engine 320. Media recommendation generator 120 may receive social network information 255 from social crawler engine 320. The components of social network platform 130 may be implemented using any suitable combination of hardware, firmware, and software. For example, the components of social network platform 130 may be implemented using one or more components of the computer system of FIG. 6.

Social crawler engine 320 of social network platform 130 represents one or more components that can scour a user's social network feeds and a user's social graph of social network platform 130 to collect social network information 255. Social crawler engine 320 may receive instructions from media recommendation generator 120 to extract specific information (e.g., trending topics) from one or more social networking websites. Social crawler engine 320 may receive instructions from media recommendation generator 120 to visit certain websites or certain pages within websites. Social crawler engine 320 uses crawlers to extract specific information from social networking websites. Social crawler engine 320 may use keywords, user profiles, groups, or any other suitable information to identify common threads within social media websites. Social crawler engine 320 may crawl APIs or web pages to retrieve specific information. Social crawler engine 320 may extract social aggregate content 300 and social personalization content 310 from one or more social media web sites.

Social aggregate content 300 includes layers and levels of interest associated with different topics (e.g., a topic of social media discussion). Social aggregate content 300 may include trending topics in social media. A trending topic is the subject of multiple posts on one or more social media websites (e.g., Facebook, Instagram, Tumblr, and Twitter) within a short period of time (e.g., an hour, a day, or a week). Social aggregate content 300 may include trending movies (e.g., the Avengers), trending television series (e.g., Westworld), trending events (e.g., the volcanic eruption in Hawaii), trending podcasts (e.g., the Gateway), and trending individuals (e.g., Lady Gaga).

Social personalization content 310 includes information on social media websites that is associated with a user of social watchlist 280. Social personalization content 310 may be obtained from a user's social graph. Social personalization content 310 may include the user's social media posts (e.g., posts to Twitter, Facebook, and Instagram). Social personalization content 310 may include the social media posts of friends (e.g., Facebook friends) of the user of social watchlist 280. Social personalization content 320 may include the social media posts of individuals or entities that the user or the user's friends are following.

Social crawler engine 320 crawls social media websites to identify common threads or trending topics and collects social aggregate content 300 and social personalization content 310. Social crawler engine 320 generates social network information 255 from collected social aggregate content 300 and social personalization content 310. Social network information 255 may include trending topics such the Avengers movie and posts by a user of social watchlist 280 discussing the trending topics. Social crawler engine 320 then transmits social network information 255 to media recommendation generator 120.

Although FIG. 3 illustrates a particular arrangement of social aggregate content 300, social personalization content 310, and social crawler engine 320, this disclosure contemplates any suitable arrangement of social aggregate content 300, social personalization content 310, and social crawler engine 320. Two or more of social aggregate content 300, social personalization content 310, and social crawler engine 320 may be connected to each other directly, bypassing network 110. Two or more of social aggregate content 300, social personalization content 310, and social crawler engine 320 may be physically or logically co-located with each other in whole or in part. Although FIG. 3 illustrates a particular number of social aggregate content 300, social personalization content 310, and social crawler engine 320, this disclosure contemplates any suitable number of social aggregate content 300, social personalization content 310, and a social crawler engine 320.

FIG. 4 shows an example user account platform 140 that may be used by system 100 of FIG. 1. User account platform 140 may include account manager 400, universal profile staging 410, universal profile 420, and authentication engine 440. Account manager 400, universal profile staging 410, universal profile 420, and authentication engine 440 may be associated with a service provider of social watchlists 280 (e.g., a satellite service provider). User account platform 140 of system 100 identifies user account information 260 (e.g., entitlements and social profiles) to transmit to media recommendation generator 120. The components of user account platform 140 may be implemented using any suitable combination of hardware, firmware, and software. For example, the components of user account platform 140 may be implemented using one or more components of the computer system of FIG. 6.

Account manager 400 of user account platform 140 is an application that manages user account information 260 for users of social watchlists 280. Account manager 400 may manage accounts for any suitable content provider (e.g., a satellite service provider). Account manager 400 may be any suitable user management platform, such as the cloud-based platform Evergent. Account manager 400 may manage a user's accounts and entitlements. For example, a user of social watchlist 280 may be a customer of a service provider (e.g., a direct broadcast satellite service provider), and account manager 400 may track the content the customer is entitled to receive based on the customer's subscription package.

Universal profile staging 410 of user account platform 140 is an application that assists account manager 400 in managing user account information 260. Universal profile staging 410 may condense user account information 260 received from account manager 400 to include user account information 260 (e.g., entitlements) that may be used by media recommendation generator 120. Condensed user account information 260 may include a user's profile, the user's entitlements (e.g., subscriptions), the names of other individuals listed on the user's account, the user's viewing history, the viewing history of friends (e.g., Facebook friends) of the user, media recommendations 275 listed on social watchlists 280 of friends of the user, and queries from user device 150.

Universal profile 420 of user account platform 140 is an application that creates a snapshot of user account information 260 based on condensed user account information 260 received from universal profile staging 410. The snapshot may include types of accounts held by the user (e.g., a satellite service provider account), user entitlements (e.g., an HBO subscription), and user profiles (e.g., user name, user address, user phone number, and individuals associated with the user's account). Universal profile 420 may transmit this snapshot of user account information 260 to media recommendation generator 120.

Authentication engine 440 is an application that authenticates users of social watchlists 280. Authentication engine 440 may grant media recommendation generator 120 access to a user's social media information (e.g., a user's social media accounts). Authentication engine 440 may assist a service provider in properly identifying and/or authenticating users (e.g., customers). Authentication engine 440 may include an authn platform and/or an authz platform. Authentication engine 440 may evaluate a user's access level. Authentication engine 440 may use methods such as static strings (e.g., passwords provided by APIs to users) or tokens (e.g., time-based tokens) to authenticate a user. Authentication engine 440 may validate a user's credentials at any suitable time, including when a user logs in to system 100 for a first time.

Authentication engine 440 may receive information from social authentication engine 430 to assist in authenticating a user. Social authentication engine 430 is an application that uses information from social networking services to sign into third-party websites. Social authentication engine 430 may transmit a single sign-on to authentication engine 440. A single sign-on may be a single ID and password input by a user to log in and gain access to multiple systems. For example, a single sign-on may be used to connect a user's social profile with the user's account profile for a satellite service.

Authentication engine 440 may retrieve user account information 260 from social media websites using social authentication engine 430. Authentication engine 440 may receive user account information 260 in the form of a user's profile (e.g., an entertainment profile or a social profile) and transmit user account information 260 to media recommendation generator 120. User account information 260 may include user entitlements from one or more social media websites.

As illustrated in FIG. 4, media recommendation generator 120 may receive user account information 260 from user account platform 140. User account information 260 received from universal profile 420 may include a user's entitlements from a satellite service provider. User account information 260 received from authentication engine 440 may include a user's entertainment profile from a social networking website.

Although FIG. 4 illustrates a particular arrangement of account manager 400, universal profile staging 410, universal profile 420, social authentication 430, and authentication engine 440, this disclosure contemplates any suitable arrangement of account manager 400, universal profile staging 410, universal profile 420, social authentication 430, and authentication engine 440. Two or more of account manager 400, universal profile staging 410, universal profile 420, social authentication 430, and authentication engine 440 may be connected to each other directly, bypassing network 110. Two or more of account manager 400, universal profile staging 410, universal profile 420, social authentication 430, and authentication engine 440 may be physically or logically co-located with each other in whole or in part. Although FIG. 4 illustrates a particular number of account managers 400, universal profile staging 410, universal profiles 420, social authentication engines 430, and authentication engines 440, this disclosure contemplates any suitable number of account managers 400, universal profile staging 410, universal profiles 420, social authentication engines 430, and authentication engines 440.

FIG. 5 shows an example method for generating a media recommendation. Method 500 begins at step 505. At step 510, one or more interfaces receives information from a social network. The information received from the social network may include social aggregate content and social personalization content. The social aggregate content may include trending movies (e.g., the Avengers), trending television series (e.g., Westworld), and trending events (e.g., the volcanic eruption in Hawaii) on a social media platform (e.g., Twitter, Facebook, or Instagram). The social personalization content may include a posting of a user of the user account to a social media platform (e.g., "I like the new Avenger movie" post on Facebook), a posting of a friend (e.g., a Facebook friend) of the user to a social media platform, a posting of a follower of the user to a social media platform, and a posting of an individual (e.g., a celebrity) or group (e.g., the Avengers cast) the user follows.

At step 520, one or more processors identifies one or more topics of interest from the received information. The topics of interest may be trending topics of a media entity. For example, a topic of interest may be the Avengers movie, the volcanic eruption in Hawaii. At step 530 the processors convert text from the received information to one or more social intents. The social intents may be user sentiments. The processors may convert text from the received information to one or more social intents by extracting keywords associated with sentiments from the text of the received information.

At step 540, the processors determine whether the social intents associated with each topic of interest are positive user sentiments. For example, the processors may assign a weight to the social intents associated with each topic of interest and determine, based on the weight, whether the social intents are positive, negative, or neutral user sentiments. If the social intents are not positive user sentiments (e.g., negative or neutral user sentiments), method 500 advances to step 585, where method 500 ends. If the social intents associated with the media recommendation are positive user sentiments, method 500 advances to step 550, where the processors determine a media recommendation for a social watchlist based on the topics of interest and the social intents.

At step 560, the interfaces receive account information from a user account. The account information includes one or more entitlements (e.g., an HBO subscription). At step 570, the processors determine whether the media recommendation complies with the entitlements. For example, the processors may determine whether the media recommendation for the HBO series Westworld complies with the user's entitlements to HBO. If the media recommendation does not comply with the entitlements, method 500 advances to step 585, where method 500 ends. If the media recommendation complies with the entitlements, method 500 advances to step 580, where the processors automatically add the media recommendation to a social watchlist associated with the user account. Method 500 then advances to step 585, where method 500 ends.

Modifications, additions, or omissions may be made to method 500 depicted in FIG. 5. Method 500 may include more, fewer, or other steps. Method 500 may include transmitting, by the processors, the social watchlist to a user device. Method 500 may include determining a weight of the media recommendation. Steps may also be performed in parallel or in any suitable order. While discussed as specific components completing the steps of method 500, any suitable component of system 100 may perform any step of method 500.

FIG. 6 shows an example computer system that may be used by the systems and methods described herein. For example, any of network 110, media recommendation generator 120, social network platform 130, user account platform 140, and user device 150 of FIG. 1 may include one or more interface(s) 610, processing circuitry 620, memory (ies) 630, and/or other suitable element(s). Interface 610 (e.g., interface 122 of FIG. 2) receives input, sends output, processes the input and/or output, and/or performs other suitable operation. Interface 610 may comprise hardware and/or software.

Processing circuitry 620 (e.g., processor 126 of FIG. 2) performs or manages the operations of the component. Processing circuitry 620 may include hardware and/or software. Examples of a processing circuitry include one or more computers, one or more microprocessors, one or more applications, etc. In certain embodiments, processing circuitry 620 executes logic (e.g., instructions) to perform actions (e.g., operations), such as generating output from input. The logic executed by processing circuitry 620 may be encoded in one or more tangible, non-transitory computer readable media (such as memory 630). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 630 (or memory unit) stores information. Memory 630 (e.g., memory 124 of FIG. 2) may comprise one or more non-transitory, tangible, computer-readable, and/or computer-executable storage media. Examples of memory 630 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
    receiving, by a processing system including a processor, social network information associated with a first social network user from a social network, according to a social crawler engine, wherein the social network information includes a social graph depicting relationships between the first social network user and a plurality of social network users;
    identifying, by the processing system, a first topic of interest from the social network information;
    determining, by the processing system, from text derived from the social network information, a first social intent, wherein the first social intent categorizes an attitude associated with the first topic of interest comprising positive attitude, negative attitude, or neutral attitude, and wherein the first social intent is determined by searching for key words;
    assigning, by the processing system, a first weight for the first topic of interest;
    assigning, by the processing system, a second weight for the first social intent;
    determining, by the processing system, a first media recommendation associated with the first user according to the first weight for the first topic of interest, the second weight for the first social intent, and the social graph;
    receiving, by the processing system, account information from an account associated with the first social network user, wherein the account information comprises a plurality of entitlements;
    determining, by the processing system, whether the first media recommendation complies with the plurality of entitlements; and
    automatically adding, by the processing system, the first media recommendation to a social watchlist associated with the account responsive to the determining the media recommendation complies with the plurality of entitlements, wherein the first media recommendation is placed into the social watchlist according to a weight of the first media recommendation, and wherein the weight of the first media recommendation is based on the first weight for the first topic of interest and the second weight for the first social intent.

2. The method of claim 1, wherein the social network information received from the social network comprises:
    social aggregate content, the social aggregate content comprising one or more of the following:
        trending movies on the social network;
        trending television series on the social network; and
        trending events on the social network; and
    social personalization content, the social personalization content comprising one or more of the following:
        a posting of the first social network user of the to the social network;
        a posting of a friend of the first social network user to the social network; and
        a posting of a follower of the first social network user to the social network.

3. The method of claim 1, wherein:
    the first topic of interest comprises a trending topic of a media entity;
    the social intent is a user sentiment;
    the entitlements comprise user subscriptions; and
    the first media recommendation comprises one of the following:
        a movie;
        a television program;
        a television series; or
        a podcast.

4. The method of claim 1, further comprising:
    determining, by the processing system, that a second media recommendation currently in the social watchlist no longer complies with the plurality of entitlements; and
    removing, by the processing system, the second media recommendation from the social watchlist responsive to the determining that the second media recommendation no longer complies with the plurality of entitlements.

5. The method of claim 1, further comprising receiving, by the processor, one or more queries from a device linked to the account, wherein the one or more queries are related to one or more media entities and the media recommendation is further determined based on the one or more queries.

6. The method of claim 1, wherein the assigning the first weight for the first topic of interest is based on a strength of a relationship between the topic of interest and the first social network user.

7. The method of claim 1, wherein the assigning the second weight for the first social intent is based on a calculated predicted level of interest of the first social network user in the topic of interest.

8. A non-transitory machine-readable medium, comprising executable instructions that, when executed by a processing system including a processor, facilitate performance of operations, the operations comprising:
- extracting social network information associated with a first social network user from a social network using a social crawler engine, wherein the social network information includes a social graph depicting relationships between the first social network user and a plurality of social network users;
- identifying a first topic of interest from the social network information;
- determining, from text derived from the social network information, a first social intent, wherein the first social intent categorizes an attitude associated with the first topic of interests comprising positive attitude, negative attitude, or neutral attitude, and wherein the first social intent is determined by searching for key words;
- assigning a first weight for the first topic of interest;
- assigning a second weight for the first social intent;
- determining a first media recommendation associated with the first user according to the first weight for the first topic of interest, the second weight for the first social intent, and the social graph;
- receiving account information from an account associated with the first social network user, wherein the account information comprises a plurality of entitlements;
- determining whether the first media recommendation complies with the plurality of entitlements; and
- automatically adding the first media recommendation to a social watchlist associated with the account responsive to the determining the media recommendation complies with the plurality of entitlements, wherein the first media recommendation is placed into the social watchlist according to a weight of the first media recommendation, and wherein the weight of the first media recommendation is based on the first weight for the first topic of interest and the second weight for the first social intent.

9. The non-transitory machine-readable medium of claim 8, wherein the social network information received from the social network comprises:
- social aggregate content, the social aggregate content comprising one or more of the following:
  - trending movies on the social network;
  - trending television series on the social network; and
  - trending events on the social network; and
- social personalization content, the social personalization content comprising one or more of the following:
  - a posting of the first social network user to the social network;
  - a posting of a friend of the first social network user to the social network; and
  - a posting of a follower of the first social network user to the social network.

10. The non-transitory machine-readable medium of claim 8, wherein:
- the first topic of interest comprises a trending topic of a media entity;
- the social intent comprises a user sentiment;
- the entitlements comprise user subscriptions; and
- the first media recommendation comprises one of the following:
  - a movie;
  - a television program;
  - a television series; or
  - a podcast.

11. The non-transitory machine-readable medium of claim 8, wherein the operations further comprise:
- assigning the weight to the first media recommendation, wherein the weight represents a calculated predicted level of interest of the first social network user in the first media recommendation.

12. The non-transitory machine-readable medium of claim 8, wherein the operations further comprise receiving one or more queries from a device linked to the account, wherein the one or more queries are related to one or more media entities and the first media recommendation is further determined based on the received queries.

13. The non-transitory machine-readable medium of claim 8, wherein the determining the first media recommendation further comprises determining that the social intent comprises a positive user sentiment.

14. The non-transitory machine-readable medium of claim 8, wherein the determining the first media recommendation is further based on a viewing history of the first social network user.

15. A system comprising a processing system including a processor and a memory coupled to the processing system comprising instructions executable by the processing system to perform operations comprising:
- extracting social network information associated with a first social network user from a social network using a social crawler engine, wherein the information includes a social graph depicting relationships between the first social network user and a plurality of social network users;
- identifying a first topic of interest from the social network information;
- determining, from text extracted from the social network information, a first social intent, wherein the first social categorizes an attitude associated with the first topic of interests comprising positive attitude, negative attitude, or neutral attitude, and wherein the first social intent is determined by searching for key words;
- assigning a first weight for the first topic of interest;
- assigning a second weight for the first social intent;
- determining a first media recommendation associated with the first user according to the first weight for the first topic of interest, the second weight for the first social intent, and the social graph;
- receiving account information from an account associated with the first social network user, wherein the account information comprises a plurality of entitlements;
- determining whether the first media recommendation complies with the plurality of entitlements; and
- automatically adding the first media recommendation to a social watchlist associated with the first social network user responsive to the determining the media recommendation complies with the plurality of entitlements, wherein the first media recommendation is placed into the social watchlist according to a weight of the first media recommendation, and wherein the weight of the first media recommendation is based on the first weight for the first topic of interest and the second weight for the first social intent.

16. The system of claim 15, wherein the social network information received from the social network comprises:
- social aggregate content, the social aggregate content comprising one or more of the following:
- trending movies on the social network;
- trending television series on the social network; and
- trending events on the social network; and
- social personalization content, the social personalization content comprising one or more of the following:
  - a posting of the first social network user of the user account to the social network;
  - a posting of a friend of the first social network user to the social network; and
  - a posting of a follower of the first social network user to the social network.

17. The system of claim 15, wherein:
- the first topic of interest comprises a trending topic of a media entity;
- the social intent comprises a user sentiment;
- the entitlements comprise user subscriptions; and
- the first media recommendation comprises one of the following:
  - a movie;
  - a television program;
  - a television series; or
  - a podcast.

18. The system of claim 15, wherein the operations further comprise:
- assigning the weight to the first media recommendation, wherein the weight represents a calculated predicted level of interest of the first social network user in the first media recommendation.

19. The system of claim 15, wherein the operations further comprise receiving one or more queries from a device linked to the account, wherein the one or more queries are related to one or more media entities and the first media recommendation is further determined based on the received queries.

20. The system of claim 15, wherein the determining the first media recommendation for the social watchlist further comprises determining that the social intent is positive.

* * * * *